United States Patent
Salmivaara et al.

(10) Patent No.: US 7,218,279 B2
(45) Date of Patent: May 15, 2007

(54) METHOD AND APPARATUS FOR POINTING THE BEAM OF A WIND PROFILER

(75) Inventors: Juha Salmivaara, Kerava (FI); Petri Haapanen, Vantaa (FI); Pentti Karhunen, Vantaa (FI)

(73) Assignee: Vaisala Oyj, Helsinki (FI)

( * ) Notice: Subject to any disclaimer, the term of this patent is extended or adjusted under 35 U.S.C. 154(b) by 0 days.

(21) Appl. No.: 10/539,050

(22) PCT Filed: Dec. 16, 2003

(86) PCT No.: PCT/FI03/00965

§ 371 (c)(1),
(2), (4) Date: Jun. 15, 2005

(87) PCT Pub. No.: WO2004/055940

PCT Pub. Date: Jul. 1, 2004

(65) Prior Publication Data

US 2006/0077099 A1    Apr. 13, 2006

(30) Foreign Application Priority Data

Dec. 17, 2002    (FI) .................................. 20022213

(51) Int. Cl.
*H01Q 3/12* (2006.01)
*H01Q 3/02* (2006.01)
(52) U.S. Cl. .................... 342/374; 342/26 D; 342/117; 342/373
(58) Field of Classification Search ................ 342/374, 342/373, 26 D, 117; 73/170.13
See application file for complete search history.

(56) References Cited

U.S. PATENT DOCUMENTS

| | | | |
|---|---|---|---|
| 3,392,394 A * | 7/1968 | Caballero, Jr. | 343/754 |
| 4,633,256 A | 12/1986 | Chadwick | |
| 5,734,349 A | 3/1998 | Lenormand et al. | |
| 5,936,592 A | 8/1999 | Ramanujam et al. | |
| 6,427,531 B1 | 8/2002 | Chintawongvanich | |
| 2002/0075183 A1* | 6/2002 | Stephens | 342/368 |
| 2002/0109630 A1 | 8/2002 | Law | |

OTHER PUBLICATIONS

Lorch Microwave, Manual Phase Shifters, http://www.lorch.com/pdf/mps.pdf, Aug. 1999.*
D. Parker et al., Phased arrays-part II: implementations, applications, and future trends, IEEE Transactions on Microwave Theory and Techniques, vol. 50(3), p. 688-698, Mar. 2002.*

* cited by examiner

*Primary Examiner*—Thomas H. Tarcza
*Assistant Examiner*—Fred H Mull
(74) *Attorney, Agent, or Firm*—Birch, Stewart, Kolasch & Birch, LLP

(57) ABSTRACT

The present invention relates to a method and apparatus for pointing the beams (63–67) of a wind profiler comprising a stationary antenna matrix (61) with several individual antenna elements (62). According to the method an input signal is fed to the antenna matrix (61), and the phase of the input signal is adjusted for the individual antenna elements (62) in order to point the beam (63–67) of the profiler. In accordance with the invention separate feeder lines for each beam are used for feeding the signals to the antenna elements (62), and the phase differences between the individual antenna elements (62) are controlled with hybrid coupler elements (3, 4).

4 Claims, 3 Drawing Sheets

METHOD AND APPARATUS FOR POINTING THE BEAM OF A WIND PROFILER

BACKGROUND OF THE INVENTION

1. Field of the Invention

The invention relates to a method for pointing the beam of a wind profilier.

The invention relates also to an apparatus for pointing the beam of a wind profiler.

2. Description of Background Art

In the prior art solutions the pointing is performed either mechanically tilting or with help of a delay line matrix implemented with coaxial delay elements and corresponding relays connecting the desired delay element to the antenna element.

Mechanical tilting requires expensive mechanical solutions. The delay line matrix is a very practical solution but the mechanical relays are unreliable and the detection of possible malfunctions of the relays is also difficult.

SUMMARY AND OBJECTS OF THE INVENTION

It is an object of the present invention to overcome the drawbacks of the above-described techniques and to provide an entirely novel type of method and apparatus for pointing the beam of a wind profiler by tilting it in four different directions and pointing it vertically.

The goal of the invention is accomplished by using separate feeder lines for each beam direction for feeding the signals to the antenna elements. The phase differences between the individual antenna elements are controlled with hybrid coupler elements.

The invention offers significant benefits over conventional techniques.

The invention improves the reliability of the control system for beam pointing. Also savings in the production costs can be achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

In the following the invention is described in greater detail with the help of exemplifying embodiments illustrated in the appended drawings in which

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENTS

Wind profilers depend upon the scattering of electromagnetic energy by minor irregularities in the index of refraction of the air.

Since these irregularities are carried by the wind, they can be used as "tracers" of the mean wind. The wind profiler transmits a beam of radio energy within a narrow band of frequencies. If the scattering volume has a component of motion toward or away from the profiler, the returned signal will be shifted in frequency by an amount proportional to the speed of this motion. By measuring this Doppler shift, one can calculate the radial velocity of the irregularities within the scattering volume and thus velocity of the wind. The radial velocity in one direction is not enough to define the wind vector; measurements in at least three directions are needed. Usually five beams are used to reduce errors due to spatial variability of the wind field.

Figure 1:
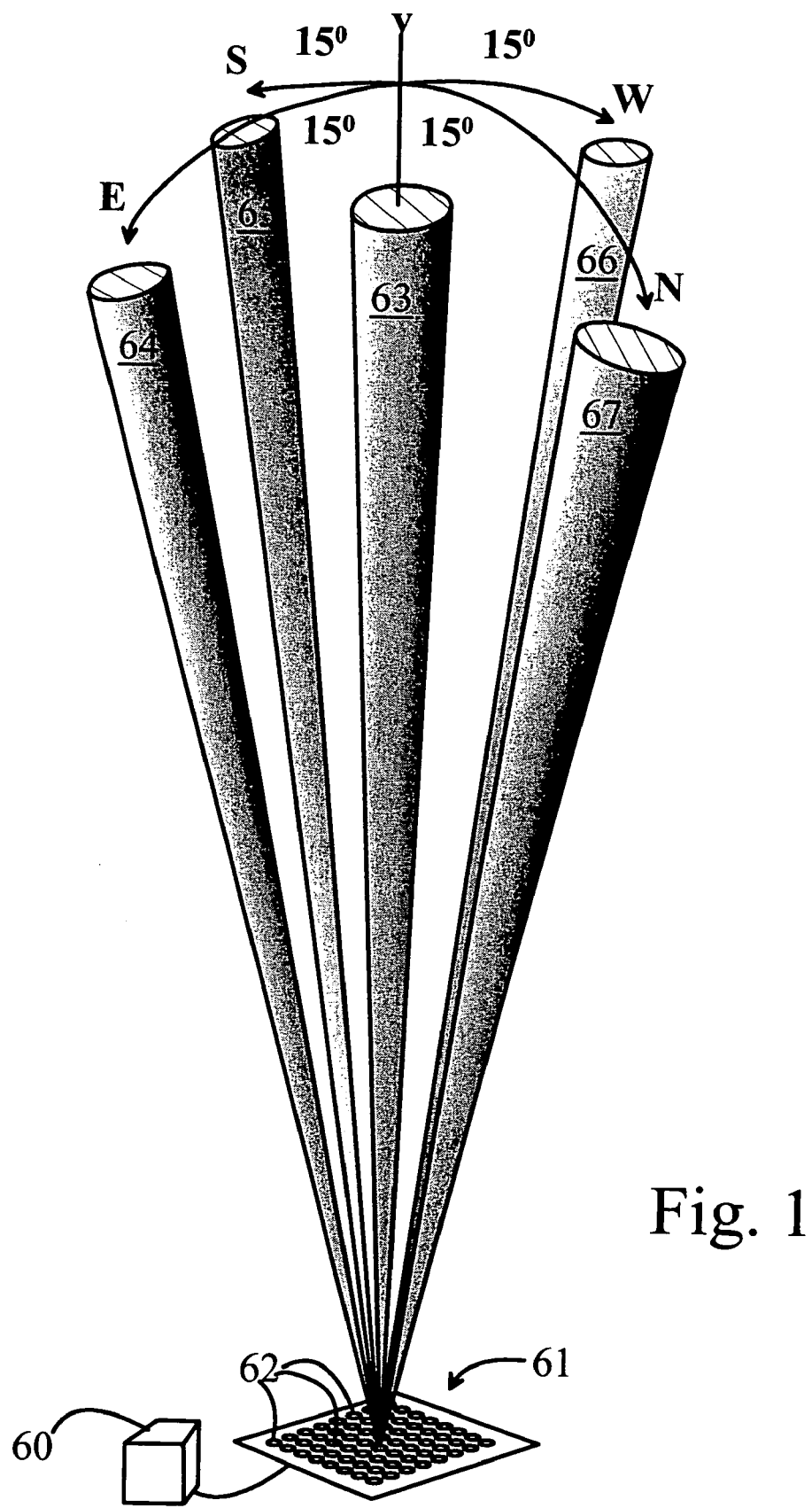
FIG. 1 shows a basic configuration of a wind-profiler.

In the usual configuration as shown in FIG. 1, measurements are made using five beams: one 64 tilted to the east, one 67 tilted to the north, one 65 to the south, one 66 to the west and one 63 vertical. The profiler beams are generally pointed to high elevation angles. The tilting is performed by a phase distribution network 60, which controls the phasing of the antenna matrix 61. Individual antenna elements 61 are phased such that the beam is aligned to the desired direction. The antenna matrix 61 is in this solution typically stationary.

Figure 2:
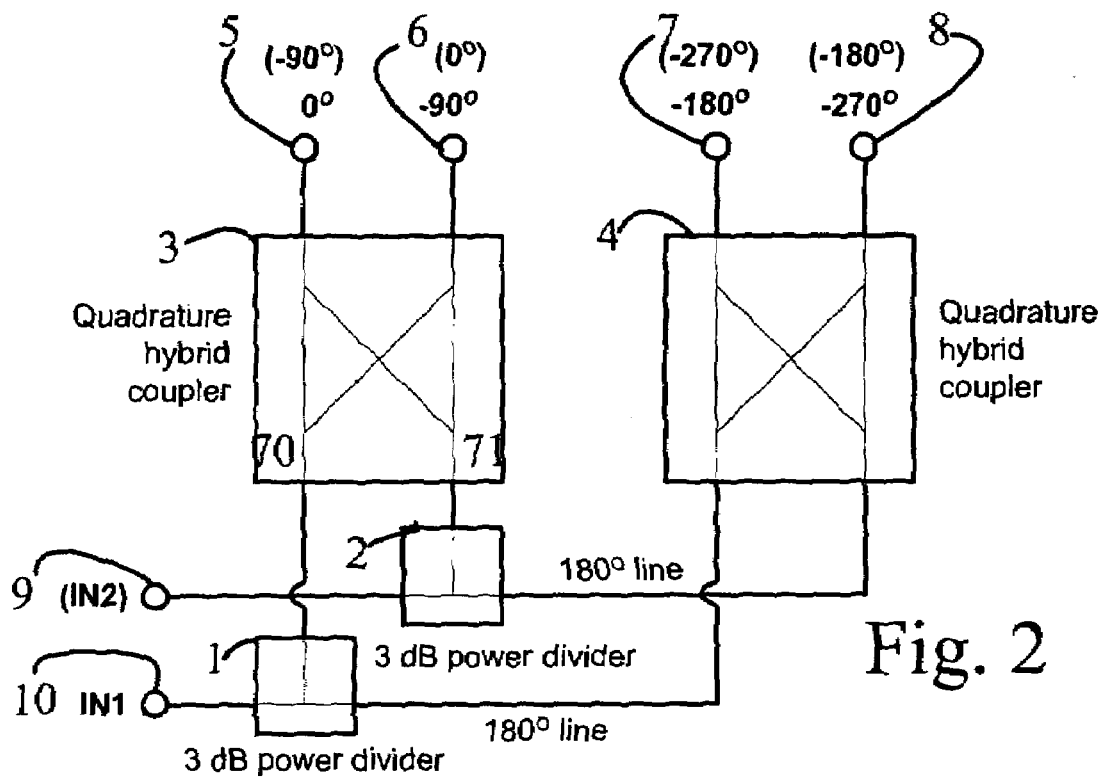
FIG. 2 shows as a block diagram a phase distribution network with 90° phase increment. The first values show the output signal phases when the input signal is fed to port IN1. The values in parentheses show the output phases when signal is fed to port IN2. All phases are relative to the "minimum delay phase".

FIG. 2 shows the basic solution of a hybrid coupler phase distribution network. The basic elements in this solution are hybrid couplers 3 and 4. These elements, for example element 3 includes two inputs 70 and 71 and two outputs 5 and 6. The signal power is equally divided between the outputs 5 and 6. If a signal is fed to input 70, output 6 has a −90° phase shift compared to the other output 5. Correspondingly, when a signal is fed to input 71, the output 5 has a −90° phase shift compared to the other output 6. Inputs 70 and 71 are isolated. Element 4 functions in the same way.

Figure 3:
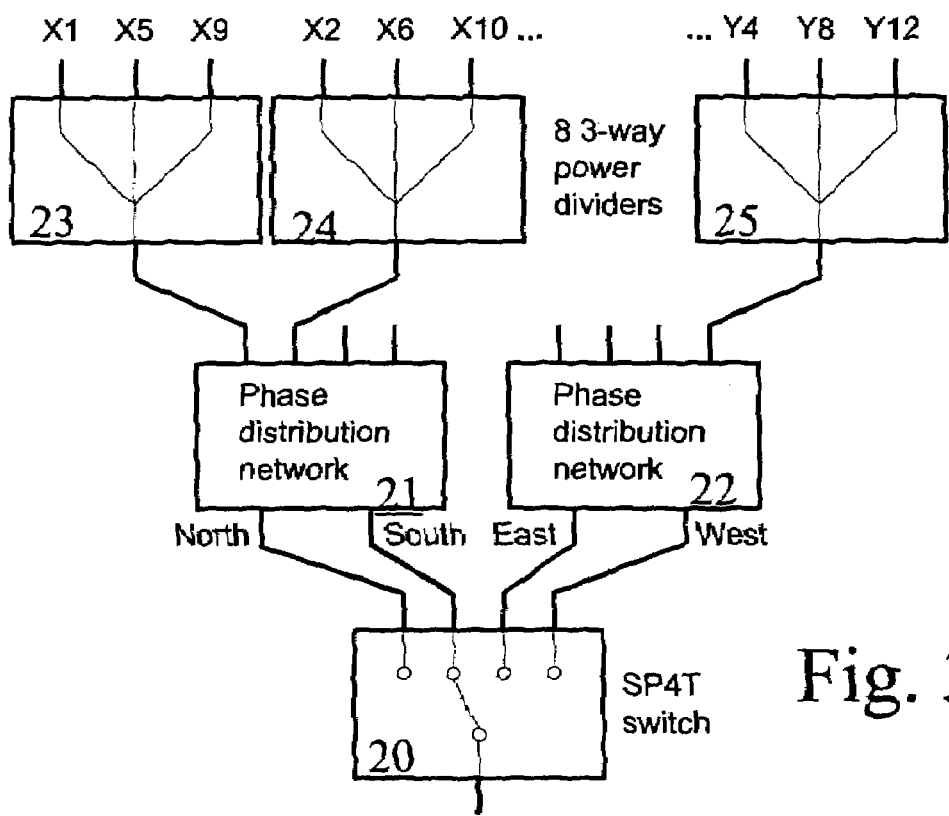
FIG. 3 shows as a block diagram phase distribution solution for a wind profiler. 90° phase shift between the rows tilts the main beam by an angle depending on wavelength and distance of the antenna elements.
Figure 4:
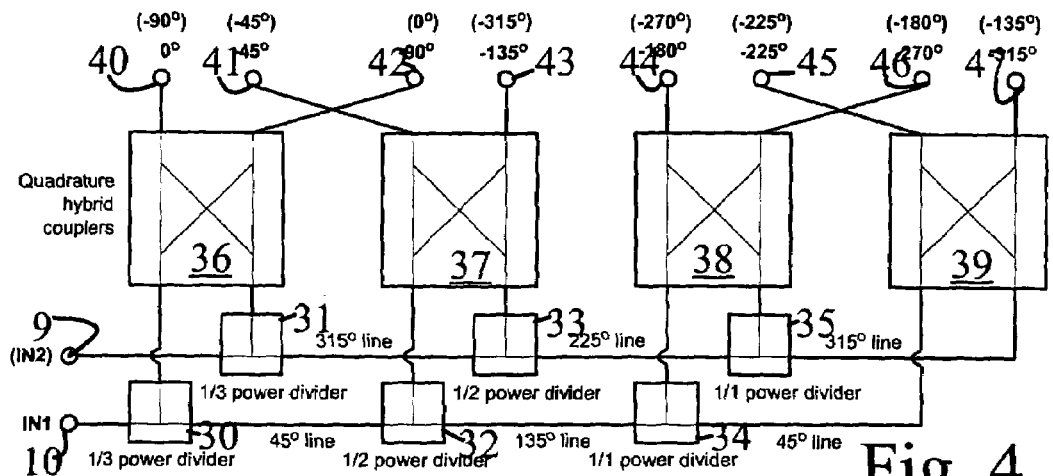
FIG. 4 shows as a block diagram a phase distribution network with 45° phase increment.

If the vertical beam is omitted a simple power division network can be used with only two inputs 9 and 10 to create two beams in opposite directions. Only one row of hybrid couplers 3 and 4 is used to create the phase distribution for the antenna rows. With two networks 21 and 22 of FIG. 2 and one SP4T-switch 20 (or three SPDT-switches) plus required number of power dividers 23, 24, 25 all four beams can be created, as shown in FIG. 3. It is also possible to create smaller phase increments, but the increment will always be 90° divided by a power of two. A phase distribution network with 45° phase increment is shown in FIG. 4. In this solution four hybrid couplers 36–39 are used and the signal power is divided equally to couplers by power dividers 30–35. The phase in the outputs 40–47 rotates whole 360° inside this network. Thus the antenna field fed by the network can be easily extended by dividing each of the network outputs.

Figure 5:
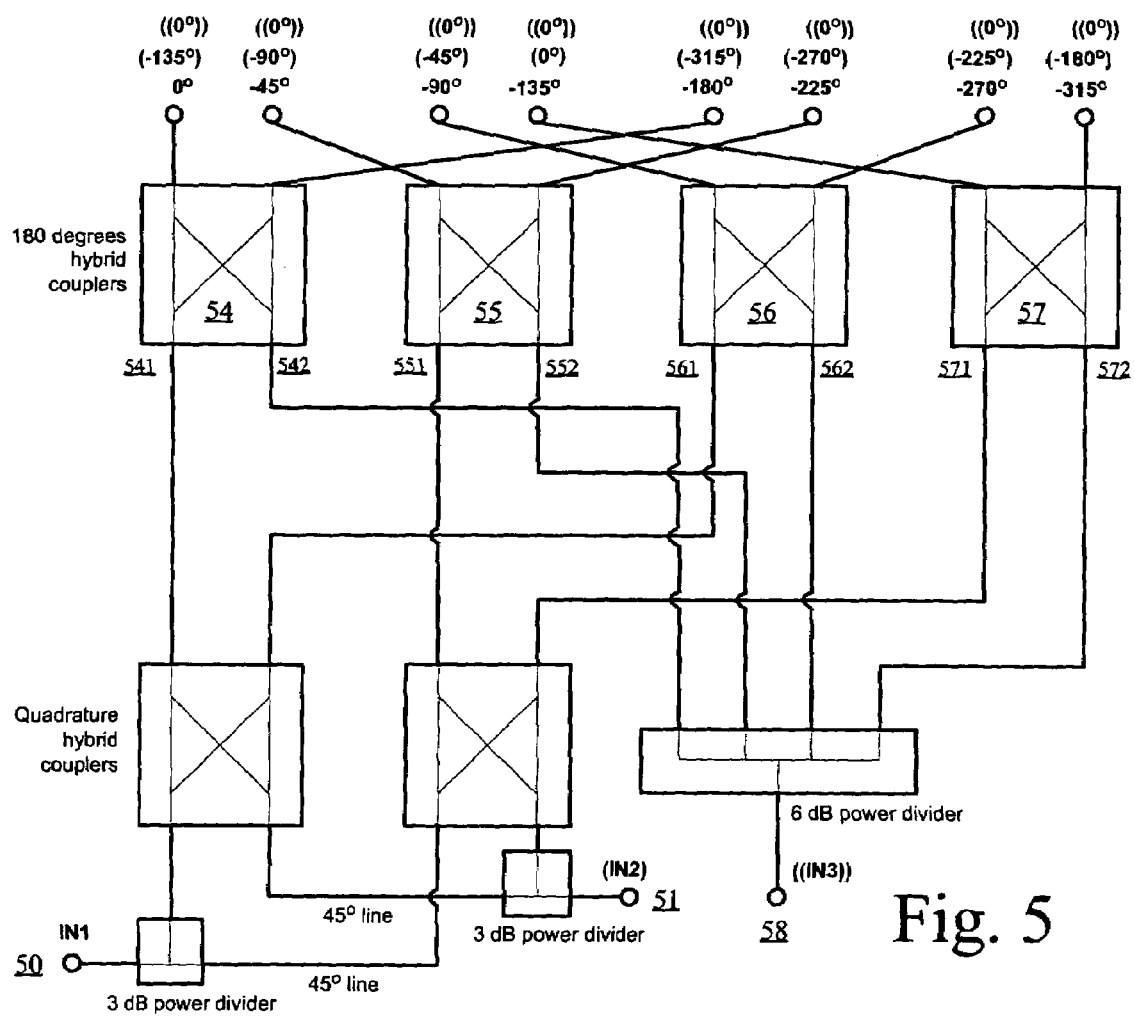
FIG. 5 shows as a block diagram a phase distribution network with 45° phase increment and a vertical beam.

Even phase distribution and thus a vertical beam can be realized by using additional row of 180° hybrid couplers 54–57 and an additional feed line (58) as in FIG. 5. If a 180° hybrid coupler is fed from the first input, the two outputs have equal phase. If a 180° hybrid coupler is fed from the second input, the two outputs have phase difference of 180° relative to each other. To form the vertical beam the inputs 541–571 of the couplers are fed by signals of even phase distribution from the input line 58. The tilted beams are formed by feeding the other inputs 542–572 of the couplers 54–57 by two quadrature hybrid couplers 52 and 53 which form an increasing or decreasing phase distribution with increment of 45° when they are fed from the inputs 50 and 51 correspondingly. By omitting hybrid couplers 53, 55 and 57 phase distribution of 90° is achieved.

To create all five beams, two of the division network of FIG. 5 must be combined in the same manner as depicted in FIG. 3. In this case a five-position switch SP5T must be used and the second vertical beam input line 58 of FIG. 5 can be omitted.

The invention claimed is:

1. A method for pointing beams of an electromagnetic wind profiler comprising a stationary antenna matrix with several individual antenna elements comprising the following steps:
    feeding an input signal to the antenna matrix,
    adjusting the phase of the input signal for each of the antenna elements to produce adjusted signals in order to point the beam of the profiler, and
    utilizing separate feeder lines for each beam direction for feeding the adjusted signals to the antenna elements,
    wherein the phase differences between the individual antenna elements are controlled with hybrid coupler elements, and
    an additional row of 180°-hybrid coupler elements are used to create a vertical beam.

2. The method in accordance with claim 1, wherein 90°-hybrid coupler elements are used to create four beams tilted in different directions.

3. An apparatus for pointing beams of an electromagnetic wind profiler comprising a stationary antenna matrix with several individual antenna elements comprising:
    means for feeding a signal to the antenna elements,
    means for adjusting the phase of the signal for each of the antenna elements to produce adjusted signals in order to point the beam of the electromagnetic wind profiler, and
    separate feeding means are used for each beam direction for feeding the adjusted signals to the antenna elements,
    wherein the phase controlling means are hybrid coupler elements; and
    an additional row of 180°-hybrid coupler elements are used to create a vertical beam.

4. An apparatus in accordance with claim 3, wherein 90°-hybrid coupler elements are used to create four beams tilted in different directions.

* * * * *